United States Patent [19]

Burris et al.

[11] 4,019,986

[45] Apr. 26, 1977

[54] PORTABLE WATER PURIFIER

[76] Inventors: William Alan Burris, 7 E. Jefferson Circle, Pittsford, N.Y. 14634; Charles A. Beaman, 2 Beaman Road, Rochester, N.Y. 14624

[22] Filed: June 11, 1973

[21] Appl. No.: 368,702

[52] U.S. Cl. ............................ 210/139; 210/192; 210/218; 210/220; 210/257 R; 21/74 A

[51] Int. Cl.[2] ................................ C02B 1/38

[58] Field of Search ......... 21/74 A, 102 R; 210/62, 210/63, 138, 139, 192, 205, 218, 220, 221, 255, 257, 285; 250/532, 536, 539, 540

[56] References Cited

UNITED STATES PATENTS

| 746,292 | 12/1903 | Clark | 210/285 |
|---|---|---|---|
| 2,328,640 | 9/1943 | Gage | 250/536 |
| 2,350,842 | 6/1944 | Tsuno | 250/536 X |
| 3,382,980 | 5/1968 | Silva | 210/192 X |
| 3,445,001 | 5/1969 | La Raus | 210/192 X |
| 3,692,180 | 9/1972 | La Raus | 210/192 X |
| 3,699,776 | 10/1972 | La Raus | 210/192 X |
| 3,726,404 | 4/1973 | Troglione | 210/192 X |
| 3,841,997 | 10/1974 | McGee | 210/15 |

Primary Examiner—Frank A. Spear, Jr.
Assistant Examiner—Robert H. Spitzer
Attorney, Agent, or Firm—Stonebraker, Shepard & Stephens

[57] ABSTRACT

A portable water purifier includes a portable ozone generator and water container and a flexible tube conducting ozone from the generator to the container. A filter-bubbler is used to bubble ozone into water in the container and then to filter the purified water as it is drawn from the container with the flexible tube serving as a siphon. A vent for the container contains an ozone decomposition catalyst for decomposing any ozone in the vented gas.

14 Claims, 3 Drawing Figures

PORTABLE WATER PURIFIER

THE INVENTIVE IMPROVEMENT

Ozone generating equipment has been used to purify water, but such equipment has been heavy, stationary, and permanently built into a water supply system. The invention involves recognition of ways that ozone generating equipment can be made compact and light enough to serve as a portable ozone generator, and the invention recognizes the need for portable water purification equipment usable at cottages, campsites, travel trailers, etc. The invention aims at an economical, lightweight, and compact water purification system that is safe, reliable, effective, and convenient and economical to operate and maintain.

SUMMARY OF THE INVENTION

The inventive purifier includes a portable ozone generator, a portable water container, and a flexible tube leading from the generator to the container to conduct ozone to the container. A bubbler introduces ozone into a lower region of the water in the container, and gas is vented from the container as the water is purified. The vent has an ozone decomposition catalyst arranged so vented gas passes through the catalyst to decompose any ozone, and means for drawing off the purified water includes a filter and a siphon.

DRAWINGS

DETAILED DESCRIPTION

Figure 1:
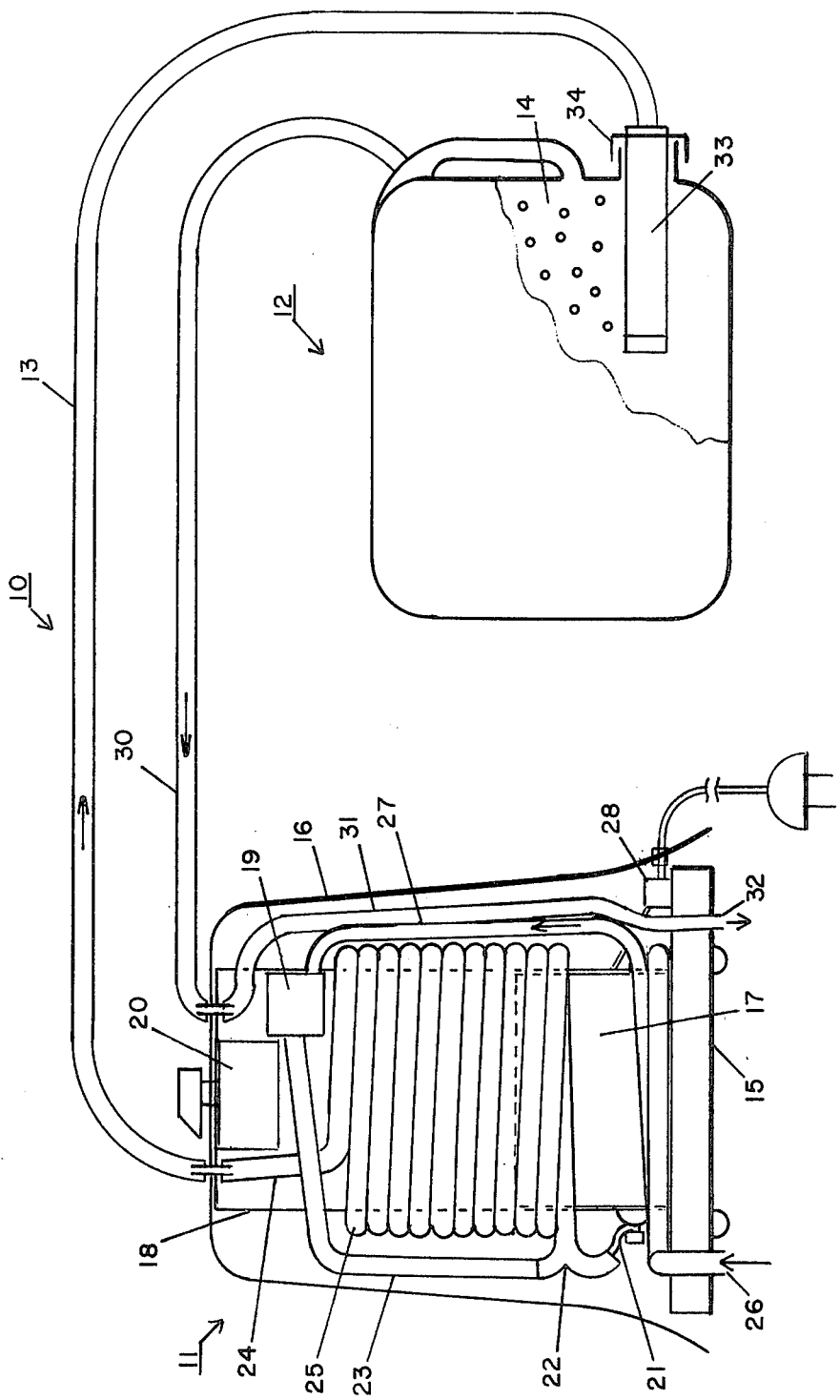
FIG. 1 is a partially schematic, partially cut-away, side elevational view of a preferred embodiment of the inventive water purifier.

Purifier 10 of FIG. 1 includes a portable ozone generator 11 and a portable water container 12 with a flexible tube 13 of an ozone resistant material leading from generator 11 to container 12 to conduct ozone to water 14 in container 12. Generally, ozone produced in generator 11 is bubbled into water 14 in container 12 until water 14 is purified, and then water 14 is drawn out of container 12 and used. First, generator 11 will be described, and then variations in the invention and its operation will be discussed.

Generator 11 includes a base 15, a protective, covering housing 16, a transformer 17 mounted on base 15, a support 18 extending above transformer 17, a pump 19 secured to support 18, a timer 20 powered electrically or mechanically, and a coiled tube, corona discharge element 25. Element 25 can be formed in several ways of a high voltage conductor, a dielectric, a ground conductor, and an air gap between the conductors to produce a corona discharge for generating ozone. Other corona discharge elements and ozone generators can also be used and are peferably selected for light weight, compact size, and reliability.

Transformer 17 supplies the high voltage through wire 21 leading into element 25 through Y connector 22, and pump 19 forces air through element 25 through an input line 23 leading to the other branch of Y 22. The air passes through the corona discharge gap inside of element 25 to produce ozone delivered through output line 24 to flexible tubing 13.

The inlet to pump 19 is through an opening 26 in base 15 and through an air inlet line 27. To protect pump 19 from the deteriorating effects of ozone, input line 27 and output line 23 are each preferably filled with an ozone decomposition catalyst to decompose any ozone in lines 23 or 27. Many ozone decomposition catalysts can be used, and any such catalyst is preferably formed so that air can pass through the catalyst.

A fuse 28 in the power supply to generator 11 is connected to disable transformer 17, pump 19, and preferably timer 20 if an overload blows fuse 28. This makes the entire generator 11 inoperative if fuse 28 blows, and this both eliminates the need for any separate signal to the user that the generator has become inoperative, and also prevents the bubbling of untreated air into container 12 in the mistaken belief that ozone is purifying water 14.

The vent line 30, also formed of ozone resistant, flexible tubing, leads from container 12 to generator 11, and a vent tube 31 inside generator 11 connects to vent line 30. Vent tube 31 leads to a vent opening 32 in base 15, and vent tube 31 is filled with an ozone decomposition catalyst in a form that allows gas to pass through tube 31. Then any ozone passing through vent line 30 is decomposed in tube 31 and rendered harmless.

Figure 2:
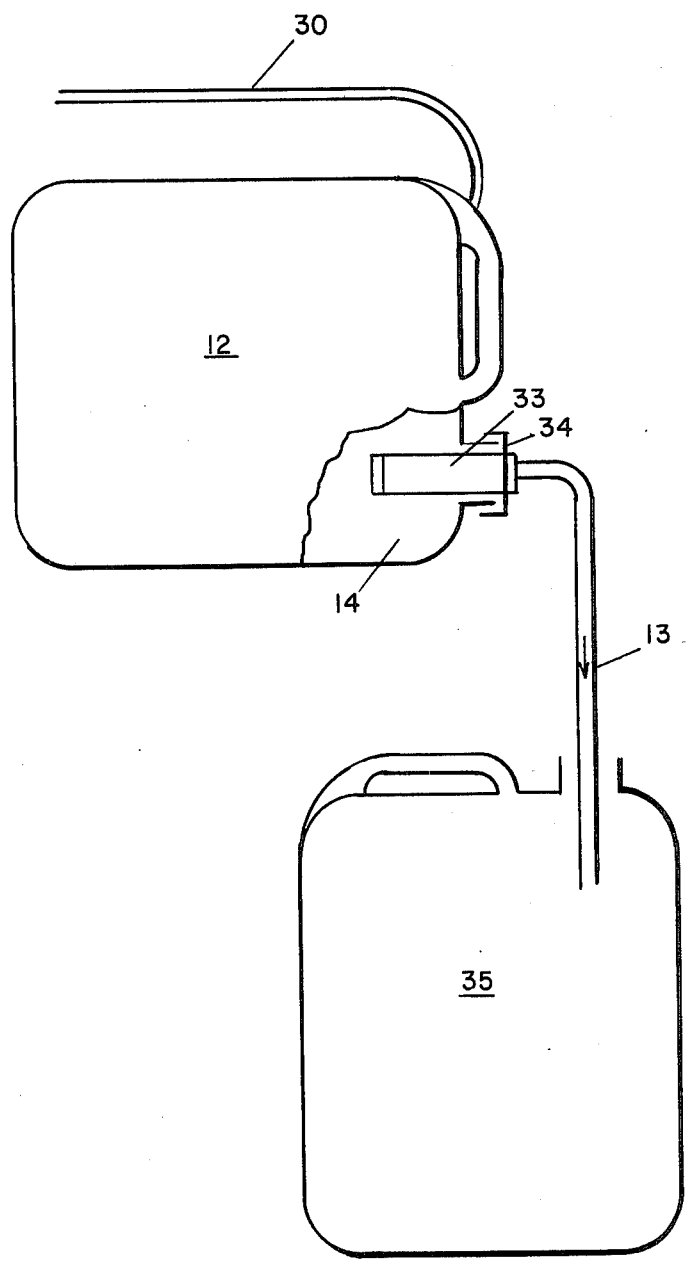
FIG. 2 is a partially schematic, partially cut-away, elevational view of a portion of the purifier of FIG. 1 showing the drawing off of purified water.

As shown in FIG. 1, ozone passing through line 13 is fed to a porous bubbler 33 that bubbles the ozone into a lower region of water 14. This is preferably accomplished as illustrated by laying container 12 on it side after it is filled through cap 34. Timer 20 is used to regulate the timed interval of the ozone treatment so that water 14 is purified when the treatment ends. Then flexible tube 13 is removed from generator 11 and led downward below container 12 as shown in FIG. 2 to draw the purified water 14 from container 12 downward into container 35 with tube 13 serving as a siphon. With such an arrangement, bubbler 33 then serves as a filter, and siphon 13 provides the pressure to force water 14 through filter 33. Container 35 can be any convenient water storage vessel or a vessel in which the water is used directly.

Figure 3:
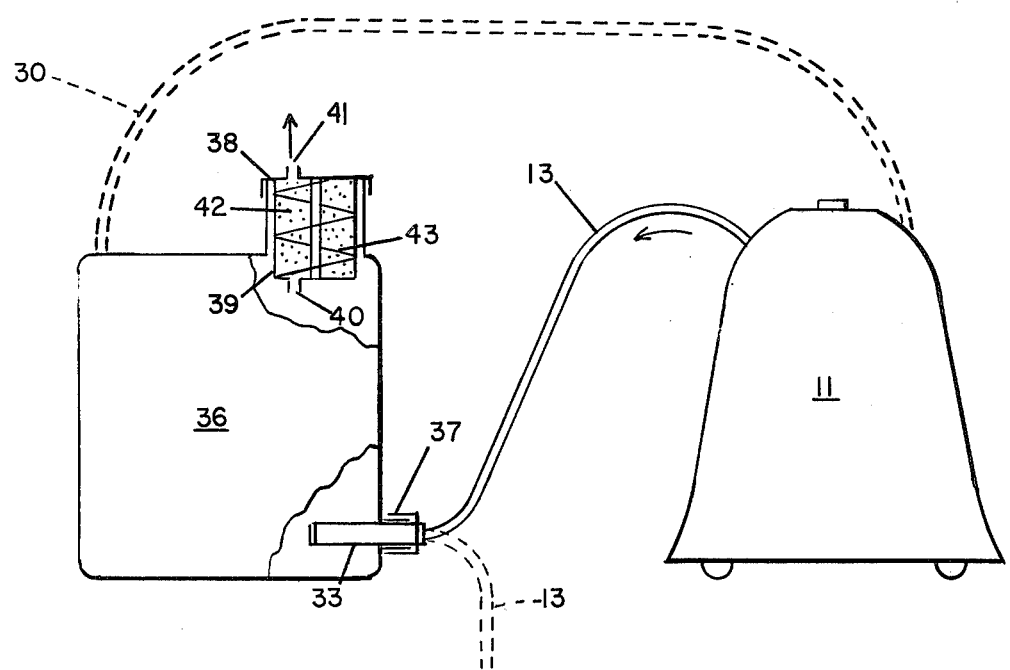
FIG. 3 is a partially schematic, partially cut-away, side elevational view of an alternative preferred embodiment of the inventive purifier.

FIG. 3 shows some variations of the inventive purifier that can be combined in several ways. Container 36 of FIG. 3 has filter-bubbler 33 arranged near the bottom of the side of the container and secured to closure cap 37. Container 36 is filled through a top opening covered by another cap 38 so that container 36 need not be turned onto its side after filling. Container 36 can use a vent line 30 as previously described and shown in phantom in FIG. 3, or a vent can be arranged in combination with cap 38 as shown in solid lines. Vent cartridge 39 is secured to the underside of cap 38 and has a bottom opening 40 spaced from a top opening 41 in cap 38. Cartridge 39 is filled with an ozone decomposition catalyst 42, and an auger-shaped element 43 inside of cartridge 39 requires vented gas to pass around a curving path leading between openings 40 and 41. Many ozone decomposition catalysts are usable in cartridge 39, and other barriers or devices requiring the gas to travel a curving path can be inserted in cartridge 39 so that any ozone is safely decomposed before the gas leaves top opening 41. Purified water is drawn from container 30 preferably by using line 13 as a siphon as previously described, with bubbler 33 serving as a filter.

All the embodiments of the invention preferably have tube connections between generator 11 and a water container arranged to lead above generator 11 so that water cannot run from a container back to the generator. Additional protection can be achieved with check valves, if desired. The generator and containers can be made in various shapes and sizes for convenient storage and use. For example, generator 11 can be shaped to hang flat against a wall, and water containers can be shaped to fit into a common package with the generator, hang on a wall, rest on a shelf under the generator, etc. Also, the different vent arrangements and draw-off arrangements can be combined in several ways besides the ones illustrated.

The overall result is a simple, economical, compact and portable water purifying system that is safe, convenient, reliable, and usable at many places where water purification is desirable. The simplicity and effectiveness of corona discharge element 25 helps make this possible, and the other features of the invention work in combination for a simple, and effective system not previously available.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will understand variations in materials and design that are possible within the scope of the invention.

We claim:

1. A portable water purifier comprising:
   a. a portable ozone generator;
   b. a portable water container independently positionable relative to said generator;
   c. a flexible tube leading from said generator to said container to conduct ozone to said container;
   d. a manually disconnectable connection joining said flexible tube to said generator;
   e. a filter connected to the end of said flexible tube opposite said disconnectable connection;
   f. means for connecting said filter to said portable water container;
   g. said portable water container being orientable for disposing said filter in a lower region of said portable water container so said filter serves as a bubbler for bubbling said ozone into said lower region of the water in said container;
   h. vent means for venting gas from said portable water container;
   i. said vent means having an ozone decomposition catalyst arranged so said gas vented through vent means passes through said catalyst to decompose any ozone in said vented gas;
   j. said flexible tube serving as a water output line from said portable water container after ozone treatment of said water;
   k. said flexible tube being arranged as a siphon for providing a pressure head for drawing said purified water from said container; and
   l. said filter serving as a filter for water withdrawn from said portable water container under pressure of said siphon.

2. The purifier of claim 1 wherein said connecting means for said filter is a closure cap for said container.

3. The purifier of claim 2 wherein said closure cap is removable for filling said container, and said container is arranged with said closure cap at a lower region of the side of said container for said bubbling of ozone into said water.

4. The purifier of claim 1 wherein said filter is removable for filling said container, and said container is arranged with said filter at a lower region of the side of said container for said bubbling of ozone into said water.

5. The purifier of claim 1 wherein said vent means comprises a flexible tube leading from said container to said generator.

6. The purifier of claim 5 wherein said generator has a tube connected to said vent tube and filled with said ozone decomposition catalyst.

7. The purifier of claim 5 wherein said flexible tube for said ozone and said flexible tube for said vent each have regions higher than the water level in said container when connected to said generator.

8. The purifier of claim 1 wherein said generator includes a corona discharge element, a transformer for supply high voltage to said element, and a pump for forcing air through said element.

9. The purifier of claim 8 including an ozone decomposition catalyst arranged in the input and output lines for said pump.

10. The purifier of claim 8 including a single fuse in the power supply to said generator to disable said pump and said corona discharge element upon overload of said power supply.

11. The purifier of claim 10 including an adjustable electric timer for preselecting time intervals of operation of said generator, and wherein said fuse is arranged to disable said timer.

12. The purifier of claim 10 including an ozone decomposition catalyst arranged in the input and output lines for said pump.

13. The purifier of claim 8 wherein said vent means comprises a flexible tube leading from said container to said generator, and said generator has a tube connected to said vent tube and filled with said ozone decomposition catalyst.

14. The purifier of claim 13 including an ozone decomposition catalyst arranged in the input and output lines for said pump and including an adjustable timer for preselecting time intervals of operation of said generator.

* * * * *